United States Patent
Tarte et al.

(10) Patent No.: US 10,025,899 B2
(45) Date of Patent: Jul. 17, 2018

(54) DEACTIVATING OR DISABLING VARIOUS VEHICLE SYSTEMS AND/OR COMPONENTS WHEN VEHICLE OPERATES IN AN AUTONOMOUS MODE

(71) Applicant: Toyota Motor Engineering & Manufacturing North America, Inc., Erlanger, KY (US)

(72) Inventors: Christopher T. Tarte, Ann Arbor, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 57 days.

(21) Appl. No.: 15/186,380

(22) Filed: Jun. 17, 2016

(65) Prior Publication Data
US 2017/0364629 A1  Dec. 21, 2017

(51) Int. Cl.
| | |
|---|---|
| G06F 19/00 | (2018.01) |
| B60Q 1/08 | (2006.01) |
| B60Q 3/10 | (2017.01) |
| B60N 2/00 | (2006.01) |
| G05D 1/00 | (2006.01) |

(52) U.S. Cl.
CPC ............ *G06F 19/00* (2013.01); *B60N 2/002* (2013.01); *B60Q 1/08* (2013.01); *B60Q 3/10* (2017.02); *G05D 1/0088* (2013.01)

(58) Field of Classification Search
CPC ...... B60H 1/00742; B60K 28/04; B60Q 1/08; B60Q 3/10
USPC ........................................................ 701/36
See application file for complete search history.

(56) References Cited

U.S. PATENT DOCUMENTS

| | | | | |
|---|---|---|---|---|
| 2,696,981 | A * | 12/1954 | Ayers, Jr. ............. | E05B 77/48 180/289 |
| 2,758,218 | A * | 8/1956 | Poznik .................. | B60K 28/04 180/273 |
| 4,911,545 | A * | 3/1990 | Miller ................... | B60R 1/078 359/841 |
| 5,381,065 | A * | 1/1995 | Jones ..................... | B60R 25/20 180/287 |
| 6,206,415 | B1 * | 3/2001 | Cuddihy ............. | B60R 21/01564 180/282 |
| 6,454,178 | B1 * | 9/2002 | Fusco ................. | B60H 1/00742 165/203 |

(Continued)

FOREIGN PATENT DOCUMENTS

CN           104648223 A       5/2015

*Primary Examiner* — Krishnan Ramesh
(74) *Attorney, Agent, or Firm* — Christopher G. Darrow; Darrow Mustafa PC (57) ABSTRACT

A computing system for a vehicle is provided. The computing system includes one or more processors for controlling operation of the computing system, and a memory for storing data and program instructions usable by the one or more processors. The one or more processors are configured to execute instructions stored in the memory to determine if the vehicle is operating with at least one occupant inside the vehicle. If the vehicle is operating without at least one occupant inside the vehicle, the system may control the vehicle so as to disable and/or deactivate selected ones of driver-usage systems/components and passenger-usage systems/components.

15 Claims, 2 Drawing Sheets

(56) References Cited

U.S. PATENT DOCUMENTS

| | | | | |
|---|---|---|---|---|
| 7,796,021 B2* | 9/2010 | Saban | | B60N 2/002 340/438 |
| 2003/0136600 A1* | 7/2003 | Breed | | B60J 10/00 180/272 |
| 2004/0109060 A1* | 6/2004 | Ishii | | B60R 1/00 348/148 |
| 2006/0151227 A1* | 7/2006 | Reith | | B60N 2/002 180/273 |
| 2008/0218381 A1* | 9/2008 | Buckley | | B60Q 1/50 340/932.2 |
| 2010/0222976 A1* | 9/2010 | Haug | | B60K 28/04 701/70 |
| 2013/0179031 A1* | 7/2013 | Whelan | | B60R 25/00 701/36 |
| 2014/0136049 A1* | 5/2014 | Kurtovic | | B60K 28/04 701/36 |
| 2014/0244106 A1* | 8/2014 | Singer | | G06F 17/00 701/36 |
| 2015/0006005 A1* | 1/2015 | Yu | | G06Q 10/08 701/22 |
| 2015/0073652 A1* | 3/2015 | Bennie | | B60W 50/00 701/36 |
| 2015/0142246 A1* | 5/2015 | Cuddihy | | B62D 1/183 701/23 |
| 2015/0142247 A1* | 5/2015 | Rao | | B60R 21/20 701/23 |
| 2015/0329079 A1* | 11/2015 | Van Wiemeersch | | B60R 25/1004 340/426.26 |
| 2017/0126680 A1* | 5/2017 | Yusuf | | H04W 12/02 |

* cited by examiner

DEACTIVATING OR DISABLING VARIOUS VEHICLE SYSTEMS AND/OR COMPONENTS WHEN VEHICLE OPERATES IN AN AUTONOMOUS MODE

TECHNICAL FIELD

The present invention relates to controlling vehicle systems and components so as to reduce energy usage by the vehicle during autonomous and semi-autonomous driving modes.

BACKGROUND

Operation of certain systems that are required for driving a conventional vehicle may be unnecessary for driving an autonomous vehicle, or may be unnecessary when the vehicle is being utilized in an autonomous mode. In such cases, the vehicle may be operated more efficiently without these systems. Operational efficiency may be very important for particular situations, for example, where an autonomous vehicle is powered by electricity. Even small increases in vehicle efficiency may enable an electric vehicle to reach a charging station in a situation where the vehicle would otherwise run out of power and be forced to stop along a side of the road. Existing control systems may not turn off and/or or prevent operation of unneeded systems in order to maximize vehicle efficiency, especially when the vehicle is operating in autonomous and semi-autonomous driving modes.

SUMMARY

In one aspect of the embodiments described herein, a computing system for a vehicle is provided. The computing system includes one or more processors for controlling operation of the computing system, and a memory for storing data and program instructions usable by the one or more processors. The one or more processors are configured to execute instructions stored in the memory to determine if the vehicle is operating with at least one occupant inside the vehicle. If the vehicle is operating without at least one occupant inside the vehicle, the system may control the vehicle so as to disable and/or deactivate selected ones of driver-usage systems/components and passenger-usage systems/components.

In another aspect of the embodiments described herein, a method of controlling a vehicle is provided. The method includes steps of: determining if the vehicle is operating with at least one occupant inside the vehicle; and, if the vehicle is operating without at least one occupant inside the vehicle, disabling and/or deactivating selected ones of driver-usage systems/components and passenger-usage systems/components.

In another aspect of the embodiments described herein, a non-transitory computer readable medium is provided. The medium has stored therein instructions executable by a computer system to cause the computer system to perform functions, the functions comprising: determining if a vehicle is operating with at least one occupant inside the vehicle; and if the vehicle is operating without at least one occupant inside the vehicle, disabling and/or deactivating selected ones of driver-usage systems/components and passenger-usage systems/components,

DETAILED DESCRIPTION

Embodiments described herein relate to a vehicle control system or computing system configured to disable or deactivate various vehicle systems and/or components when the vehicle is being driven in a driverless, autonomous mode. If the vehicle is unoccupied, certain systems and/or components may be turned off if they have been left on by a vehicle occupant during a previous use of the vehicle, or certain systems and/or components may be disabled to prevent them from being activated. This may aid in preventing wastage of power and in reducing wear on vehicle systems and components.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Also disclosed herein are non-transitory computer readable media with stored instructions. The instructions could be executable by a computing system or device to cause the computing system or device to perform functions similar to those described in the methods described below.

As will be appreciated by one skilled in the pertinent the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data, instructions or events as described herein may be transferred between a source and a destination in the form of electromagnetic waves traveling through signal-conducting media such as metal wires, optical fibers, and/or wireless transmission media (e.g., air and/or space).

Figure 1:
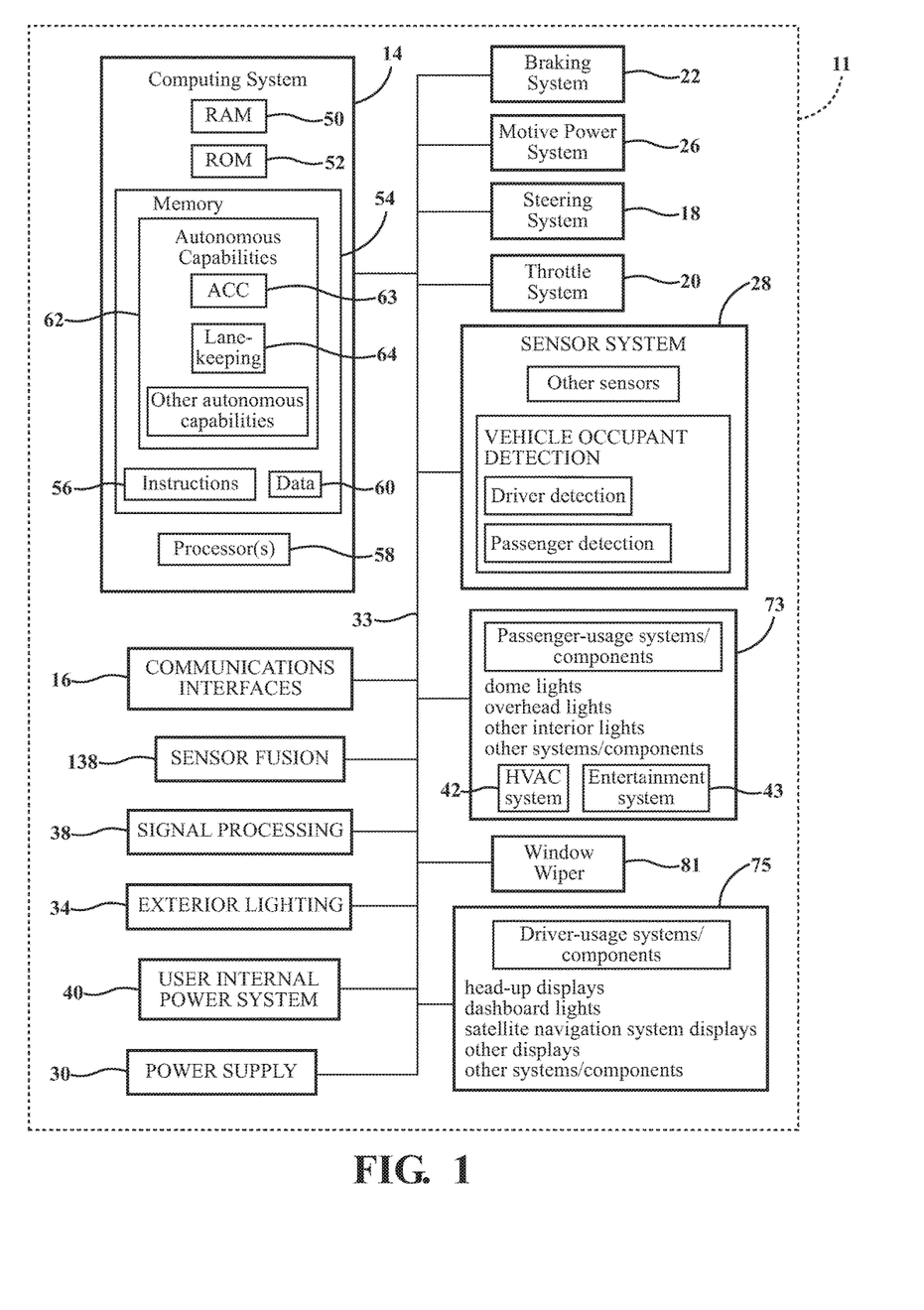
FIG. 1 is a functional block diagram illustrating a vehicle in accordance with an example embodiment described herein.

FIG. 1 is a functional block diagram illustrating a vehicle 11 in accordance with an example embodiment. The vehicle 11 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 11 may be configured to operate fully or partially in an autonomous mode. While in autonomous mode, the vehicle 11 may be configured to operate without human interaction. For example, in an autonomous mode in which an adaptive cruise control (ACC) system is activated, the vehicle may operate the throttle, braking and other systems so as to maintain a safe distance from a vehicle traveling ahead of the vehicle, without input from a vehicle occupant.

The vehicle 11 may include various systems, subsystems and components in operative communication with each other, such as a sensor system or array 28, a computing system 14, one or more communications interfaces 16, a steering system 18, a throttle system 20, a braking system 22, a power supply 30, a motive power system 26, and other systems and components needed for operating the vehicle as described herein. In the example shown in FIG. 1, the vehicle also includes a heating, ventilation and air conditioning (HVAC) system 42, an entertainment system 43, a vehicle user internal power system 40, a window wiper system 81, an exterior lighting system 34, and may also include other systems (not shown). The vehicle 11 may include more or fewer subsystems and each subsystem could include multiple elements. Further, each of the subsystems and elements of vehicle 11 could be interconnected. Thus, one or more of the described functions of the vehicle 11 may be divided up into additional functional or physical components or combined into fewer functional or physical components. In some further examples, additional functional and physical components may be added to the examples illustrated by FIG. 1.

The entertainment system 43 may include any audio and/or visual devices (for example, DVD players, radios, associated speaker systems,) usable for entertainment by the vehicle occupants. The vehicle user internal power system 40 may include elements such as the cigarette lighter, A/C power outlets, USB ports, and similar features. The window wiper system 81 may include any wipers (for front or windshield, rear window, and/or other windows).

The sensor system 28 may include a number of sensors configured to sense information about an external environment of the vehicle 11. For example, the sensor system 28 may include a navigation unit such as a Global Positioning System (GPS) (not shown), an inertial measurement unit (IMU) (not shown), a RADAR unit (not shown), a laser rangefinder/LIDAR unit (not shown), and one or more cameras (not shown) comprising devices configured to capture a plurality of images of the interior of the vehicle and/or an external environment of the vehicle 11. The camera(s) may be still cameras or video cameras. The IMU may incorporate any combination of sensors (e.g., accelerometers and gyroscopes) configured to sense position and orientation changes of the vehicle 11 based on inertial acceleration. For example, the IMU may sense such parameters as vehicle roll rate, yaw rate, pitch rate, longitudinal acceleration, lateral acceleration, and vertical acceleration. The navigation unit may be any sensor configured to estimate a geographic location of the vehicle 11. To this end, the navigation unit may include a one or more transceivers, including a transceiver operable to provide information regarding the position of the vehicle 11 with respect to Earth.

The sensor system 28 may also include sensors configured to monitor internal systems, components, and/or conditions of the vehicle 11 (e.g., an $O_2$ monitor, a fuel gauge, an engine oil temperature). Other sensors are possible as well. One or more of the sensors included in the sensor system 28 may be configured to be actuated separately or collectively in order to modify a position, an orientation, or both, of the one or more sensors.

In a known manner, the vehicle sensors 28 provide data used by the computing system 14 in formulating and executing suitable control commands for the various vehicle systems. For example, data from inertial sensors, wheel speed sensors, road condition sensors, and steering angle sensors may be processed in formulating and executing a command in steering system 18 to turn the vehicle. Vehicle sensors 28 may include any sensors required to support any driver assistance capabilities incorporated into the vehicle 11. The sensor system 28 can include any suitable type of sensor. Various examples of different types of sensors are described herein. However, it will be understood that the embodiments are not limited to the particular sensors described. In arrangements in which the sensor system 28 includes a plurality of sensors, the sensors can work independently from each other. Alternatively, two or more of the sensors can work in combination with each other. Sensors of the sensor system 28 can be operatively connected to the computing system 14 and/or any other element of the vehicle 11.

The sensor system 28 may include various types of sensors in communication with other control system components, for providing feedback on operations of the vehicle. For example, sensors 28 may detect and store data corresponding to the vehicle's location (e.g., GPS coordinates), speed and direction, rates of acceleration or braking, and specific instances of sudden acceleration, braking, and swerving. Sensors 28 also may detect and store data received from the vehicle's internal systems, relating to such factors as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's various computing devices.

Additional ones of sensors 28 may detect and store information relating to external driving conditions, for example, external temperature, rain, snow, light levels, and sun position for driver visibility. For example, external cameras and proximity sensors may detect other nearby vehicles, traffic levels, road conditions, traffic obstructions, animals, cyclists, pedestrians, and other conditions that may factor into a driving event data analysis. Sensors 28 also may detect and store data relating to moving violations and the observance of traffic signals and signs by the vehicle. Additional ones of sensors 28 may detect and store data relating to the maintenance of the vehicle, such as the engine status, oil level, engine coolant temperature, odometer reading, the level of fuel in the fuel tank and/or the battery or electrical power level in a gas-hybrid vehicle, engine revolutions per minute (RPMs), and/or tire pressure. Additional ones of sensors 28 may detect the orientation of the driver seat (for example, whether the driver seat is facing toward a front of the vehicle or is swiveled or rotated so as to face in another direction). Additional ones of sensors 28 may detect an angular orientation of a seat back of the driver's seat, to determine if the seat back is upright or reclined. Additional ones of sensors 28 may detect the presence or absence of a driver's hands on the vehicle steering wheel, the presence or absence of a vehicle occupant in a particular seat, and the presence or absence of the driver's feet on one or more of the accelerator, brake and clutch pedals.

Vehicle sensors 28 also may include cameras and/or proximity sensors capable of recording additional conditions inside or outside of the vehicle. For example, internal cameras may detect conditions such as the number of the passengers and the types of passengers (e.g. adults, children, teenagers, pets, etc.) in the vehicle, and potential sources of driver distraction within the vehicle (e.g., pets, phone usage, unsecured objects in the vehicle). Sensors 28 also may be configured to collect data a driver's movements or the condition of a driver. For example, vehicle 11 may include sensors that monitor a driver's movements, such as the driver's eye position and/or head position, whether the driver's eyes are on the road, etc. Additional ones of sensors 28 may collect data regarding the physical or mental state of the driver, such as fatigue or intoxication, or whether the driver is asleep. The condition of the driver may also be determined through the movements of the driver or through other sensors, for example, sensors that detect the direction in which the driver's eyes are facing or which detect the content of alcohol in the air or blood alcohol content of the driver, such as a breathalyzer. These sensors may be operatively coupled to a driver monitoring system or routine incorporated into computing system 14.

Certain of vehicle sensors 28 also may collect information regarding the driver's route choice, whether the driver follows a given route, and to classify the type of trip (e.g. commute, errand, new route, etc.). In certain embodiments, sensors and/or cameras may determine when and how often the vehicle stays in a single lane or stray into other lanes. A Global Positioning System (GPS), locational sensors positioned inside the vehicle, and/or locational sensors or devices external to the vehicle may be used determine the route, lane position, and other vehicle position/location data. Any data collected by vehicle sensors 28 may also be transmitted to any vehicle system or component requiring or utilizing the data for the purposes described herein. For example, the data collected by vehicle sensors 28 may be transmitted to computing system 14, or to one or more specialized system or component controllers (not shown). Additional particular types of sensors may include any other types of sensors needed to perform the functions and operations described herein.

Information from particular vehicle sensors may be processed and used to control more than one vehicle system or component. For example, in a vehicle incorporating both automated steering and braking control, various road condition sensors may provide data to the computing system to enable the computing system to process the road condition information in accordance with stored processor-executable instructions, and to formulate appropriate control commands to both the steering system and braking system.

If a sensor output signal or other signal requires preprocessing prior to use by the computing system or another vehicular (or extra-vehicular) system or element, a known or suitable processing means (for example, an analog-to-digital (A/D) converter or digital-to-analog (D/A) converter) may be introduced between the sensor system (or the pertinent sensor(s)) and the pertinent system/element or incorporated into the pertinent system/element. Similarly, if operation of any actuatable sub-system or sub-system components (for example, components of the steering system or throttle system) will require processing of a control signal received from the computing system prior to use, a known or suitable processing means may be introduced between the computing system and the actuatable sub-system components or incorporated into the sub-system.

A sensor fusion algorithm 138 may be an algorithm (or a computer program product storing an algorithm) configured to accept data from the sensor system 28 as an input. The data may include, for example, data representing information sensed at the sensors of the sensor system 28. The sensor fusion algorithm may process data received from the sensor system to generate an integrated or composite signal (formed, for example, from outputs of multiple individual sensors). The sensor fusion algorithm 138 may include, for instance, a Kalman filter, a Bayesian network, or other algorithm. The sensor fusion algorithm 138 may further provide various assessments based on data from the sensor system 28. In an example embodiment, the assessments may include evaluations of individual objects or features in the environment of the vehicle 11, evaluation of a particular situation, and evaluate possible impacts based on the particular situation. Other assessments are possible. The sensor fusion algorithm 138 may be stored on a memory (such as memory 54) incorporated into or in operative communication with computing system 14 of another computing system or device, may be executed by the associated computing system or device, in a manner known in the art.

The use of "continuously" when referring to the reception, gathering, monitoring, processing, and/or determination of any information or parameters described herein means that the computing system 14 is configured to receive and/or process any information relating to these parameters as soon as the information exists or is detected, or as soon as possible in accordance with sensor acquisition and processor processing cycles. For example, a failure of a sensor used for automated vehicle control may become known when a test signal transmitted through the sensor produces a negative result, or when the automated system employing the sensor attempts to use the sensor for vehicle control. As soon as the computing system 14 receives data from sensors or information relating to the status of a vehicle component for example, the computing system acts in accordance with stored programming instructions. Similarly, the computing system may receive and process an ongoing or continuous flow of information from sensor system 28 and from other information sources. This information is processed and/or evaluated in accordance with instructions stored in a memory, in a manner and for the purposes described herein.

The computing system 14 may be operatively connected to the other vehicle systems and elements and otherwise configured so as to affect control and operation of the vehicle 11 and its components as described herein. The computing system 14 may be configured to control at least some systems and/or components autonomously (without user input) and/or semi-autonomously (with some degree of user input). The computing system may also be configured to control and/or execute certain functions autonomously and/or semi-autonomously. The computing system 14 may additionally or alternatively include components other than those shown and described.

The computing system 14 may control the functioning of the vehicle 11 based on inputs and/or information received from various subsystems (e.g., motive power system 26, sensor system 28, steering system 18, etc.), from any of the communications interfaces 16, and/or from any other suitable source of information. In an example embodiment, the computing system 14 could be operable to provide control over many aspects of the vehicle 11 and its subsystems.

FIG. 1 illustrates a block diagram of an exemplary computing system according to one or more illustrative embodiments of the disclosure. The computing system 14 may have some or all of the elements shown in FIG. 1. In addition, the computing system 14 may also include additional components as needed or desired for particular applications. The computing system 14 may also represent or be embodied in a plurality of controllers or computing devices that may process information and/or serve to control individual components or subsystems of the vehicle 11 in a distributed fashion. Many or all of the functions of the vehicle 11 could be controlled by the computing system 14.

The computing system 14 may include one or more processors 58 (which could include at least one microprocessor) for controlling overall operation of the computing system 14 and associated components, and which executes instructions stored in a non-transitory computer readable medium, such as the memory 54. "Processor" means any component or group of components that are configured to execute any of the processes and/or process steps described herein or any form of instructions to carry out such processes/process steps or cause such processes/process steps to be performed. The processor(s) 58 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other. In one or more arrangements, the processor(s) 58 can be a main processor of the vehicle 11. For instance, the processor(s) 58 can be part of an electronic control unit (ECU).

In some embodiments, the computing system 14 may include RAM 50, ROM 52, and/or any other suitable form of computer-readable memory. The memory 54 may comprise one or more computer-readable memories. A computer-readable storage or memory 54 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM (Random Access Memory), a PROM (Programmable Read-Only Memory), an EPROM (Erasable Programmable Read-Only Memory), a FLASH-EEPROM (Electrically Erasable Programmable Read-Only Memory), any other memory chip or cartridge, or any other medium or any combination thereof from which computer programmable instructions or code can read. The memory or memories 54 can be a component of the computing system 14, or the memory or memories can be operatively connected to the computing system 14 for use thereby. The term "operatively connected," as used throughout this description, can include direct or indirect connections, including connections without direct physical contact.

The memory 54 may contain data 60 and/or instructions 56 (e.g., program logic) executable by the processor(s) 58 to execute various functions of the vehicle 11, including those described above in connection with FIG. 1. The memory 54 may contain additional instructions as well, including instructions to transmit data to, receive data from, interact with, or control one or more of the vehicle systems and/or components described herein (for example, motive power system 26, sensor system 28, computing system 14, and the communication interfaces 16). In addition to the instructions 56, the memory 54 may store data such as roadway maps, path information, among other information. Such information may be used by the vehicle 11 and the computer system 14 at during the operation of the vehicle 11 in the autonomous, semi-autonomous, and/or manual modes.

The computing system 14 may be configured to coordinate control of the various actuatable vehicle systems and components so as to implement one or more autonomous vehicle control capabilities including autonomous driving assistance capabilities (generally designated 62). These autonomous capabilities 62 may be stored in memory 54 and/or in other memories and implemented in the form of computer-readable program code that, when executed by a processor, implement one or more of the various processes, instructions or functions described herein. A driving assistance capability may be defined as a capability which assists a driver in operating the vehicle by performing one or more functions which may be performed by the driver if the capability is absent or deactivated. Examples of driving assistance capabilities include adaptive cruise control (ACC) 63 and lane-keeping 64.

An adaptive cruise control capability 63 may be defined as a cruise control system that automatically adjusts the vehicle speed to maintain a safe distance from vehicles ahead, based in information from onboard vehicle sensors. Thus, responsive to inputs from the vehicle sensors, for example, the computing system 14 may control the throttle system, braking system, motive power system and any other pertinent systems as required to implement the ACC functions.

A lane keeping capability 64 may be defined as a system designed to alert the driver when the system detects that the vehicle is about to leave or deviate from a traffic lane. Thus, responsive to inputs from the vehicle sensors, for example, the computing system 14 may control the steering and other pertinent systems as required to implement the lane-keeping functions.

In one or more arrangements, the computing system 14 described herein can incorporate artificial or computational intelligence elements, e.g., neural network, fuzzy logic or other machine learning algorithms. Further, in one or more arrangements, the hardware and/or software elements configured for performing particular functions or operations described herein may be distributed among a plurality of elements and/or locations.

In addition to computing system 14, the vehicle may incorporate additional computing systems and/or devices (not shown) to augment or support the control functions performed by computing system 14, or for other purposes.

Communications interfaces 16 may be configured to allow interaction between the vehicle 11 and external sensors, other vehicles, other computer systems, various external messaging and communications systems (such as a satellite system or cellular phone/wireless communication system) and/or a user. The communications interfaces 16 may include a user interface for providing information to or receiving input from a user of the vehicle 11. For example, the communications interfaces 16 may include a voice/audio interface (not shown) (for example, a microphone and speaker for providing audio input and output), keypad, touch screen, and/or stylus through which a user of the computing system 14 may provide input, and may also include and a video display device (not shown) for providing textual, audiovisual and/or graphical output from the computing system. The computing system 14 may be configured to interpret or process any received audio input as a response to a query or an instruction for the computing system. The user interface may control or enable control of content and the layout of interactive images that may be displayed on the display. A display in the form of a touch screen may provide information to a user of the vehicle 11. The user interface could also be operable to accept input from the user via the touch screen. The touch screen may be configured to sense at least one of a position and a movement of a user's finger via capacitive sensing, resistance sensing, or a surface acoustic wave process, among other possibilities. The touch screen may be capable of sensing finger movement in a direction parallel or planar to the touch screen surface, in a direction normal to the touch screen surface, or both, and may also be capable of sensing a level of pressure applied to the touch screen surface. The touch screen may be formed of one or more translucent or transparent insulating layers and one or more translucent or transparent conducting layers. The touch screen may take other forms as well.

The display can be any other suitable type of display. For instance, the display can be a liquid crystal display (LCD), a light emitting diode (LED) display or some other suitable display. In one or more arrangements, the display can be a heads-up display, a display for a navigation system, and/or a display included in an instrument cluster. The display(s) can be provided in any suitable location within the vehicle 11.

Computing system 14 may operate in a networked environment supporting connections to one or more remote computers, such as other computing devices, terminals and/or mobile devices (e.g., mobile phones, short-range vehicle communication systems, vehicle telematics devices and vehicle-to-vehicle communications systems)(not shown). Any other computing systems or devices in the vehicle and any related terminals or devices in operative communication with computing system 14 may include devices installed in vehicles, mobile devices that may travel within vehicles, or devices outside of vehicles that are configured to receive and process vehicle and driving data. Thus, any terminals or devices in communication with the computing system 14 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, suitably-configured wearable devices (such as a watchband and the like)(not shown), and may include some or all of the elements described above with respect to the computing system 14. In addition, any of these device embodiments may include a haptic interface or may be configured to provide haptic feedback to a vehicle occupant to inform the occupant of any information or condition which should be communicated to the occupant.

The communications interfaces 16 may also include interfaces enabling communication in a wide area network (WAN), a wireless telecommunications network, and/or other communications networks. The network(s) described herein can be implemented as, or include, without limitation, a dedicated short-range communication (DSRC) network, a wide area network (WAN), a local area network (LAN), the Public Switched Telephone Network (PSTN), a wireless network, a mobile network, a Virtual Private Network (VPN), the Internet, and/or one or more intranets. The communication network(s) further can be implemented as or include one or more wireless networks, whether short or long range. For example, in terms of short range wireless networks, the communication network(s) can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network(s) can include a mobile, cellular, and or satellite-based wireless network and support voice, video, text, and/or any combination thereof. Examples of long range wireless networks can include GSM, TDMA, CDMA, WCDMA networks or the like. The communication network (s) can include wired communication links and/or wireless communication links. The communication network(s) can include any combination of the above networks and/or other types of networks. The communication network(s) can include one or more routers, switches, access points, wireless access points, and/or the like. In one or more arrangements, the communication network(s) can include Vehicle-to-Everything (V2X) technologies (including Vehicle-to-Infrastructure (V2I) and Vehicle-to-Vehicle (V2V) technologies), which can allow for communications between any nearby vehicle(s), and the vehicle 11 and any nearby roadside communications nodes and/or infrastructure.

When used in a WAN networking environment, the computing system 14 may include (or be operatively connected to) a modem or other means for establishing communications over the WAN, such as network (e.g., the Internet). When used in a wireless telecommunications network, the computing system 14 may include (or be operatively connected to) one or more transceivers, digital signal processors, and additional circuitry and software for communicating with wireless computing devices (not shown) via one or more network devices (e.g., base transceiver stations) in the wireless network. These configurations provide various ways of receiving a constant flow of information relating to vehicle operating conditions from external various sources.

The vehicle 11 may include various actuatable sub-systems and elements in operative communication with computing system 14 and other vehicle systems and/or components, and which are operable (at least to some degree) responsive to control commands received from the computing system. Various actuatable sub-systems and elements may be controlled manually or automatically (by computing system 14) depending on such factors as a given driving situation and/or whether autonomous driving assistance systems (for example, ACC and/or lane keeping) are activated.

The steering system may include such elements as the vehicle wheels, rack-and-pinion steering gears, steering knuckles, and/or any other elements or combination of elements that may be operable to adjust the heading of vehicle 11. The wheels (not shown) of the vehicle 11 may be tires. The wheels of the vehicle 11 may be configured in various formats, including a unicycle, bicycle, tricycle, or a four-wheel format, such as on a car or a truck, for example. Other wheel geometries are possible, such as those including six or more wheels. Any combination of the wheels of vehicle 11 may be operable to rotate differentially with respect to other wheels. The wheels may represent at least one wheel that is operatively coupled to the transmission (not shown) and at least one tire coupled to a rim of the wheel that could make contact with the driving surface. The wheels may include a combination of metal and rubber, or another combination of materials.

The motive power system 26 may include components operable to provide powered motion for the vehicle 11. In an example embodiment, the motive power system 26 may include an engine (not shown), an energy source (such as gasoline, diesel fuel, or a one or more electric batteries in the case of a hybrid vehicle), and a transmission (not shown). The engine may be any combination of an internal combustion engine, an electric motor, steam engine, Stirling engine, or other types of engines or motors. In some example embodiments, the motive power system 26 may include multiple types of engines or motors. For instance, a gas-electric hybrid car could include a gasoline engine and an electric motor. Other examples are possible. The transmission may include elements that are operable to transmit mechanical power from the engine to the wheels. To this end, the transmission could include a gearbox, a clutch, a differential, and drive shafts. The transmission may include other elements. The drive shafts may include one or more axles that could be coupled to the one or more vehicle wheels.

The braking system 22 could include any combination of elements and/or mechanisms configured to decelerate the vehicle 11. The braking system 22 could use friction to slow the wheels. In other embodiments, the braking system 22 may convert the kinetic energy of the wheels to electric current. The braking system 22 may take other forms as well.

The throttle system may include elements and/or mechanisms (for example, an accelerator pedal) configured to control, for instance, the operating speed of the engine and, in turn, control the speed of the vehicle 11.

FIG. 1 shows just a few examples of vehicle sub-systems 18, 20, 22, 26 which may be incorporated into a vehicle. A particular vehicle may incorporate one or more of these systems or other systems (not shown) in addition to one or more of the systems shown.

The power supply 30 may provide power to various components of the vehicle 11 and could represent, for example, a rechargeable lithium-ion or lead-acid battery. In some embodiments, one or more banks of such batteries could be configured to provide electrical power. Other power supply materials and configurations are possible. In some embodiments, the power supply 30 and the energy source (not shown) could be implemented together, as in some all-electric cars.

The vehicle 11 may be configured so that the computing system 14, sensor system 28, actuatable sub-systems 18, 20, 22, 26 and other systems and elements thereof can communicate with each other using a controller area network (CAN) bus 33 or the like. Via the CAN bus and/or other wired or wireless mechanisms, the computing system 14 may transmit messages to (and/or receive messages from) the various vehicle systems and components. Alternatively, any of the elements and/or systems described herein may be directly connected to each other without the use of a bus. Also, connections between the elements and/or systems described herein may be through another physical medium (such as wired connections) or the connections may be wireless connections.

Although FIG. 1 shows various components of vehicle 11, computing system 14, memory 54, and communications interfaces 16, as being integrated into the vehicle 11, one or more of these components could be mounted or associated separately from the vehicle 11. For example, memory could, in part or in full, exist separate from the vehicle 11. Thus, the vehicle 11 could be provided in the form of device elements that may be located separately or together. The device elements that make up vehicle 11 could be communicatively coupled together in a wired or wireless fashion.

Embodiments described herein relate to a computing system configured to disable or deactivate various vehicle systems and/or components when the vehicle is being driven in a driverless, autonomous mode. As used herein, "activation" of the systems and/or components means that the systems and/or components are turned on if they are currently off. "Deactivation" of the systems and/or components means that the systems and/or components are turned off if they are currently on. "Disabling" of the systems and/or components means that the systems and/or components are prevented from switching on automatically (for example, based on detection of ambient light level or other trigger conditions) or under conditions where they would do so if there was a driver in the car (for example, for displays and cockpit instrumentation and indicator lights normally used by the driver). In cases where components and/or systems are not disabled or deactivated, they may be left on or enabled.

A "driver-usage system/component" may be a vehicle system or component which may be needed by the driver in order to drive the vehicle manually, but which may not be needed by the vehicle to perform autonomous driving maneuvers. Examples of such systems and components include headlights, head-up displays, dashboard lights, satellite navigation system displays, and other displays (for example, a touchscreen), a window wiper system (for example, system 81). This is different from some other exterior lights (for example, daytime running lights, fog lights, or license plate lights) which have the primary purpose of illuminating the vehicle (or portions thereof) to other vehicles, drivers, and pedestrians. This is also different from components such as turn signals and high mount stop lights, used for informing other vehicles, drivers, and pedestrians of what the driver or vehicle is intending to do. For example, headlights may be needed by the driver mainly for illuminating the road and route in front of the vehicle during manual driving maneuvers. The illumination provided by headlights may also be used by vehicle camera systems. However, an increasing number of vehicles incorporate devices such as thermographic cameras or other night vision aids. These systems (in addition to or in conjunction with radar, sonar, and other sensors) may be more effective at detecting nearby vehicle and road conditions under low-ambient light conditions. In vehicles including such systems, it may be feasible and desirable to deactivate headlights to save power, because the night-vision aids may consume less power and may be more effective in the dark. In addition, headlights may not be necessary for vehicle visibility in low-light conditions because other exterior lights (for example, running lights and LED arrays positioned along various locations on the vehicle exterior) may be configured to enhance visibility. Other systems and/or components may also fall into the category of driver-usage systems/components.

A "passenger-usage system/component" may be a vehicle system or component which is not needed by the driver for manual driving of the vehicle, but which may be used by a vehicle occupant other than the driver (or by an occupant traveling in the driver seat) while the occupant resides within the vehicle. Examples of such systems and components include dome lights, overhead lights, and other interior lights. Other systems and/or components (for example, the heating-ventilation and air conditioning 42 (HVAC) system, the user internal power system 40, and the vehicle entertainment system 43 (DVD players, WIFI capability, stereo/radio systems)) may also fall into the category of passenger-usage systems/components.

Figure 2:
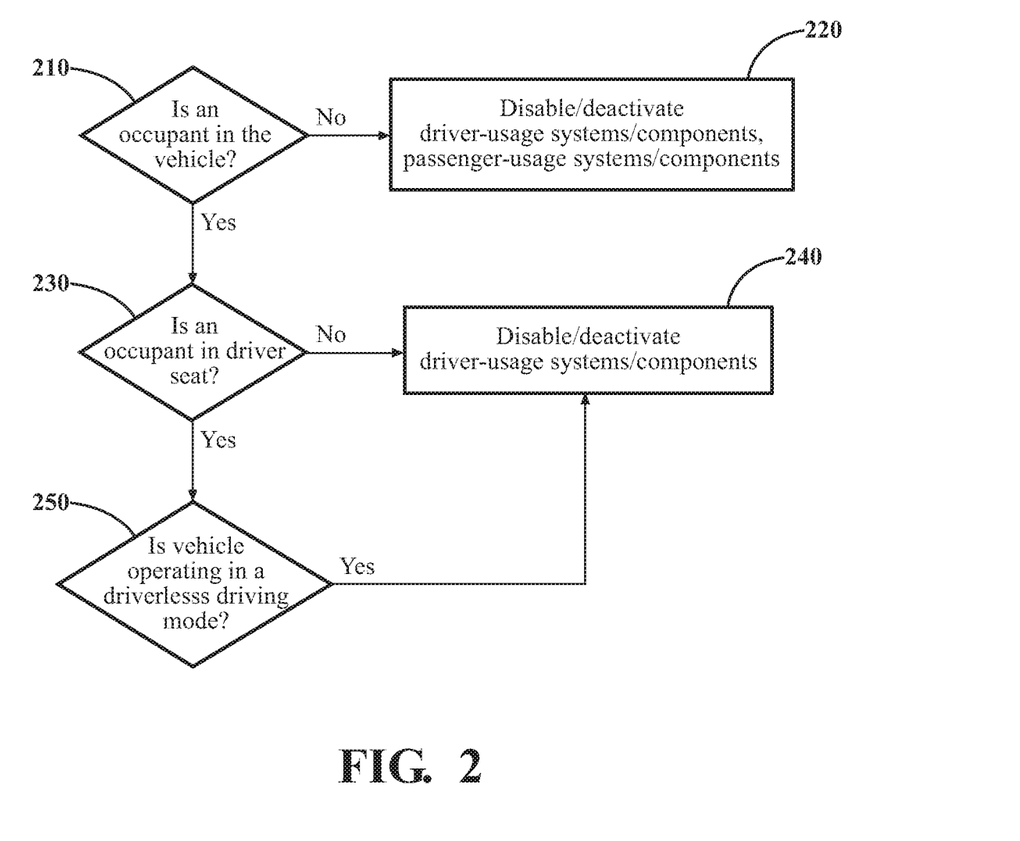
FIG. 2 is a flow diagram illustrating an implementation of a method of determining various vehicle systems and/or components to disable or deactivate when a vehicle is being driven in a driverless, autonomous mode, in accordance with an embodiment described herein.

FIG. 2 is a flow diagram illustrating an example of an operating mode of a computing system 14 in accordance with an embodiment described herein. The operations shown in FIG. 2 may be executed when the vehicle is operating. "Operating" may include any situation in which the engine is turned on. The vehicle 11 may be moving (either autonomously or under the direction of a human driver), stopped in a traffic lane (for example, at a stop sign), in the process of parking, or idling, for example.

In block 210, the system 14 may determine if there is an occupant in the vehicle. Occupant(s) may be in the driver and/or passenger seats when the vehicle is operated in an autonomous (i.e., driverless) driving mode. When the vehicle is operating in such a mode, the occupant in the driver seat may have no driving functions to perform and may essentially be traveling as a passenger.

Occupant(s) may also be in the driver and/or passenger seats when the vehicle is operated in a semi-autonomous driving mode. A "semi-autonomous driving mode" means that a portion of the navigation and/or maneuvering of the vehicle along a travel route is performed by one or more computing systems, and a portion of the navigation and/or maneuvering of the vehicle along a travel route is performed by a human driver. When the vehicle is operating in such a mode, the occupant in the driver seat may need to exercise a degree of control over driving operations which is dependent on the vehicle autonomous system capabilities, driving conditions, traffic situations, etc.

Occupant(s) may also be in the driver and/or passenger seats when the vehicle is operated in a manual driving mode. "Manual driving mode" means that a substantial majority or all of the navigation and/or maneuvering of the vehicle along a travel route is performed by a human driver with minimal or no input from (or operation of the vehicle by) a computing system.

The system 14 may be configured to continuously monitor whether there is an occupant in the vehicle and where the occupant is seated, in case, for example, an occupant enters or leaves the vehicle while the engine is on but the vehicle is stationary. The presence and location(s) of occupant(s) in the vehicle may be determined using any suitable means, for example, vehicle interior camera systems, seat sensors, or other means.

If there is no occupant in an operating vehicle, it may be assumed (at least until someone enters the vehicle) that the vehicle is operating in a driverless mode. In this case, in block 220, the computing system may control the vehicle to disable or deactivate either all or selected ones of the driver-usage systems/components and passenger-usage systems/components. This is because the driver-usage systems/components will not be required for manual operation of the vehicle, and no passenger-usage systems/components will be needed for passenger use. The particular driver-usage systems/components and passenger-usage systems/components to be disabled or deactivated for vehicle operation in a driverless mode may be predetermined and programmed into the computing system, or the systems/components to be disabled or deactivated may be pre-selected by a user (for example, using an interactive display or other interface).

In block 230, if it is determined that there is an occupant in the vehicle, the system determines if there is an occupant in the driver seat. If it is determined that there is no occupant in the driver seat, it may be assumed that the only occupant(s) are in one or more passenger seats. In this case, since no occupant is in the driver seat, it may be assumed that the vehicle is operating in a driverless mode. In this case, the driver-usage systems/components are not needed, and these systems/components may be disabled or deactivated in block 240.

If it is determined in block 230 that there is an occupant in the driver seat, the system determines in block 250 if the vehicle is operating in a driverless driving mode. If the vehicle is determined to be operating in a driverless driving mode, the driver-usage systems/components are not needed, and these systems/components may be disabled or deactivated in block 240. However, if the vehicle is determined not to be operating in a driverless driving mode, the driver-usage systems/components may be needed by the occupant in the driver seat for control of the vehicle. In this case, these systems/components are left active or enabled. Thus, in the arrangement shown, if there is at least one occupant in the vehicle, the passenger-usage systems/components are left active or enabled.

The system described enables systems and components which do not need to be used during operation of the vehicle to be deactivated or disabled responsive to the operational mode of the vehicle (autonomous, semiautonomous or manual) and/or the locations of the vehicle occupants within the vehicle. This may be especially useful for electrically powered vehicles and gas-hybrid vehicles.

The flow diagrams and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A computing system for a vehicle, the computing system comprising one or more processors for controlling operation of the computing system, and a memory for storing data and program instructions usable by the one or more processors, wherein the one or more processors are configured to execute instructions stored in the memory to:
   determine if the vehicle is operating with at least one occupant inside the vehicle;
   if the vehicle is operating without at least one occupant inside the vehicle, disable and/or deactivate user pre-selected ones of driver-usage systems/components and passenger-usage systems/components,
   wherein the user pre-selected ones of the driver-usage systems/components include one or more of headlights, head-up displays, dashboard lights, satellite navigation system displays, and other displays.

2. The computing system of claim 1 wherein the one or more processors are configured to execute instructions stored in the memory to:
   if the vehicle is operating with at least one occupant inside the vehicle, determine if at least one vehicle occupant is in a driver seat of the vehicle; and
   if at least one vehicle occupant is not in a driver seat of the vehicle, disable and/or deactivate user pre-selected ones of driver-usage systems/components.

3. The computing system of claim 2 wherein the one or more processors are configured to execute instructions stored in the memory to:
   if at least one vehicle occupant is in a driver seat of the vehicle, determine if the vehicle is operating in a driverless driving mode; and
   if the vehicle is operating in a driverless driving mode, disable and/or deactivate user pre-selected ones of driver-usage systems/components.

4. The computing system of claim 1 wherein the user pre-selected ones of the passenger-usage systems/components include one or more of dome lights and overhead lights.

5. A vehicle including a computing system in accordance with claim 1.

6. A method of controlling a vehicle, comprising steps of:
   determining if the vehicle is operating with at least one occupant inside the vehicle;
   if the vehicle is operating without at least one occupant inside the vehicle, disabling and/or deactivating selected ones of driver-usage systems/components and/or passenger-usage systems/components;
   if the vehicle is operating with at least one occupant inside the vehicle, determining if at least one vehicle occupant is in a driver seat of the vehicle;
   if at least one vehicle occupant is not in a driver seat of the vehicle, disabling and/or deactivating the selected ones of driver-usage systems/components;
   if at least one vehicle occupant is in a driver seat of the vehicle, determining if the vehicle is operating in a driverless driving mode;
   if the vehicle is operating in a driverless driving mode, disabling and/or deactivating selected ones of the driver-usage systems/components; and
   if the vehicle is not operating in a driverless driving mode, leaving the driver-usage systems/components active or enabled.

7. The method of claim 6 further comprising the steps of:
   if the vehicle is operating with at least one occupant inside the vehicle, determining if at least one vehicle occupant is in a driver seat of the vehicle; and
   if at least one vehicle occupant is not in a driver seat of the vehicle, disabling and/or deactivating selected ones of driver-usage systems/components.

8. The method of claim 7 further comprising the steps of:
   if at least one vehicle occupant is in a driver seat of the vehicle, determining if the vehicle is operating in a driverless driving mode; and
   if the vehicle is operating in a driverless driving mode, disabling and/or deactivating selected ones of driver-usage systems/components.

9. The method of claim 6 wherein the selected ones of the driver-usage systems/components include one or more of headlights, head-up displays, dashboard lights, satellite navigation system displays, and other displays.

10. The method of claim 6 wherein the selected ones of the passenger-usage systems/components include one or more of dome lights and overhead lights.

11. The method of claim 6 wherein the selected ones of driver-usage systems/components and passenger-usage systems/components are user-selected ones of driver-usage systems/components and passenger-usage systems/components.

12. A computing system for a vehicle, the computing system comprising one or more processors for controlling operation of the computing system, and a memory for storing data and program instructions usable by the one or more processors, wherein the one or more processors are configured to execute instructions stored in the memory to:

determine if the vehicle is operating with a vehicle occupant in a driver seat of the vehicle;

if the vehicle is operating with a vehicle occupant in a driver seat of the vehicle, determine if the vehicle is operating in a driverless driving mode; and if the vehicle is operating in a driverless driving mode, disable and/or deactivate selected ones of driver-usage systems/components.

13. The computing system of claim 12 wherein the one or more processors are configured to execute instructions stored in the memory to:

if at least one vehicle occupant is not in a driver seat of the vehicle, disable and/or deactivate selected ones of driver-usage systems/components.

14. The computing system of claim 12 wherein the selected ones of driver-usage systems/components are user-selected ones of driver-usage systems/components.

15. A vehicle including a computing system in accordance with claim 12.

* * * * *